(12) United States Patent
Clausen et al.

(10) Patent No.: US 11,111,181 B2
(45) Date of Patent: Sep. 7, 2021

(54) CEMENT WITH REDUCED PERMEABILITY

(71) Applicant: RESTONE AS, Fyllingsdalen (NO)

(72) Inventors: Jill Angelique Clausen, Fyllingsdalen (NO); Astri Kvassnes, Hjellestad (NO)

(73) Assignee: RESTONE AS, Fyllingsdalen (NO)

( * ) Notice: Subject to any disclaimer, the term of this patent is extended or adjusted under 35 U.S.C. 154(b) by 0 days.

(21) Appl. No.: 17/107,330

(22) Filed: Nov. 30, 2020

(65) Prior Publication Data
US 2021/0163360 A1 Jun. 3, 2021

Related U.S. Application Data

(63) Continuation of application No. PCT/NO2020/050291, filed on Nov. 27, 2020.

(30) Foreign Application Priority Data

| Dec. 2, 2019 | (NO) | 20191424 |
| Feb. 16, 2020 | (NO) | 20200204 |
| Apr. 17, 2020 | (NO) | 20200472 |

(51) Int. Cl.
*C04B 28/24* (2006.01)
*C09K 8/46* (2006.01)

(52) U.S. Cl.
CPC ............... *C04B 28/24* (2013.01); *C09K 8/46* (2013.01)

(58) Field of Classification Search
None
See application file for complete search history.

(56) References Cited

U.S. PATENT DOCUMENTS

| 4,396,723 A * | 8/1983 | Temple | ................. C04B 18/027 |
| | | | 106/601 |
| 8,425,717 B2 * | 4/2013 | Wagh | ....................... B27K 5/04 |
| | | | 156/325 |
| 2011/0254190 A1 * | 10/2011 | Wagh | ...................... C08L 97/02 |
| | | | 264/128 |

* cited by examiner

*Primary Examiner* — Jeffrey D Washville
(74) *Attorney, Agent, or Firm* — Flener IP & Business Law; Zareefa B. Flener

(57) ABSTRACT

A cementitious mixture to make structures with reduction of gas permeability was disclosed. The mixture includes, cementitious materials, and one or more divalent magnesium-iron silicate that in neutral or basic aqueous solutions have the capacity to be a latent hydraulic binder comprising 2% to 99% of divalent magnesium-iron silicate by weight of total hydraulic solid materials. This can be used to produce a cementitious structure for preventing gas transfer between a first region and a second region. A cement slurry was also disclosed.

12 Claims, 8 Drawing Sheets

CEMENT WITH REDUCED PERMEABILITY

CROSS REFERENCE TO RELATED APPLICATIONS

This application claims priority to pending International Application PCT/NO2020/050291 (filed Nov. 27, 2020) and Norwegian applications NO20200204 (filed Feb. 16, 2020), NO20200472 (filed Apr. 17, 2020), and NO20191424 (filed Dec. 2, 2019). The entire contentions of these are hereby incorporated by reference.

FIELD OF THE INVENTION

The present invention relates to the field of cementitious materials such as Portland Cement, pozzolans and geopolymers. The purpose of the invention is to apply divalent magnesium-iron solid solution silicates (for example the mineral groups olivine, orthopyroxene, amphibole, and serpentine), here called "magnesium-iron silicates", as latent hydraulic binders for cementitious mineral admixtures, thereby providing long term hydrostatic pressure of the structure, by increasing the integrity, volume, weathering and/or lifetime of the cementitious mineral admixture structure in order to achieve superior seals against gas migration. In particular, the sealing of structures against carbon dioxide and nitrogen.

The term "divalent magnesium-iron solid solution silicates" is a term of the art in geological and mineralogical sciences. A common short-hand term in the art is "magnesium-iron silicates". In natural earth-based systems, there are more magnesium ions than iron ions present.

Magnesium-iron silicates have variable compositions due to "solid-solution" chemistry mainly involving $Mg^{2+}$ and $Fe^{2+}$ ions. These are silicate systems where iron and magnesium ions can occupy the same place in the mineral. This is called substitution and can occur over the complete range of possible compositions because iron and magnesium have a similar atomic radius ($Fe^{+2}=0.78$ Å and $Mg^{+2}=0.72$ Å) and can have the same valence state.

As an example, the formula for olivine is often given as: $(Mg,Fe)_2SiO_4$. To one skilled in the art, olivine can be thought of as a mixture of $Mg_2SiO_4$ (forsterite—Fo) and $Fe_2SiO_4$ (fayalite—Fa). If there is more forsterite than fayalite (thus more magnesium than iron), it can be referred to as a magnesium-iron silicate. If there was more fayalite than forsterite, then it can be referred to as an iron-magnesium silicate.

As another example, the formula for orthopyroxene is often given as: $(Mg,Fe)_2Si2O_6$. To one skilled in the art, olivine can be thought of as a mixture of $Mg_2Si_2O_6$ (Enstatite—En) and $Fe_2Si_2O_6$ (Ferrosilite). Orthopyroxenes always have some Mg present in nature and pure Ferrosilite is only made artificially. Orthopyroxene with more Mg than Fe is referred to as a magnesium-iron silicate. If there was more ferrosilite than enstatite, then it can be referred to as an iron-magnesium silicate.

The present invention relates to a cementitious mixture for reduction of gas permeability. Additionally structures to prevent the transfer of gas (including in a super critical state) from one region to another. Finally, the present invention relates to a cement structures prepared by the method.

BACKGROUND FOR THE INVENTION

The invention relates to the decreased gas permeability of cementitious structures over time by including/adding magnesium-iron silicates in cementitious mineral admixtures as a latent hydraulic binder, and to increase its capacity to handle weathering and exposure to flow of water mixtures on and through the cementitious materials.

Portland cement is a common type of cement used around the world. Depending on the raw materials used and the process used to combine them, Portland cements can be modified easily. Type of cement is classified by American Society for Testing and Materials (ASTM) as Type I, II, III, or V white cement, and by American Petroleum Institute (API) as Class A, C, G, or H.

The present invention is a new cement type as it provides long term hydrostatic pressure of the structure by increasing in volume when exposed to hazard conditions like high temperatures and pressure, gasses and liquids.

Well Integrity is defined in NORSOK D-010: "application of technical, operational and organizational solutions to reduce risk of uncontrolled release of formation fluids throughout the life cycle of a well". AND: "There shall be two well barriers available during all well activities and operations, including suspended or abandoned wells, where a pressure differential exists that may cause uncontrolled outflow from the borehole/well to the external environment".

To ensure safe and economic sustainable operations with wells, cement is an important component. It is a factor to secure a well barrier to prevent leakages and reduce risk under well activities like drilling, producing and intervention. Primary cementing provides zonal isolation. To correct problems associated with the primary cement job, a remedial cementing can be necessary. Cement is also used in the oil- and gas industry for plug and abandonment (prepare the well to be closed permanently (P&A) and to close the well permanently (PP&A)).

Cement, as used as a binder in concrete, is also highly relevant for topics like nuclear waste deposits, oil- and gas reservoirs, landfilling, carbon dioxide storage in geological formations, as well as in sealing off hazardous gases emanating from the ground into homes and businesses.

Alternatives proposed to ordinary well cements are Geopolymers. These are materials that are visco-elastic. An example of this physical property is the mixture of cornflour and water; it is hard when handled and soft when held. Another example is Bingham Plastic. This behaves like mayonnaise (soft when handled, hard when held). Neither of these products are currently reasonably priced or particularly standard friendly.

Metamorphism is the mineralogical and structural adjustment of solid rocks to physical and chemical conditions that have been imposed at depths below the near surface zones of weathering and diagenesis, and that differ from those conditions under which the rocks in question originated.

Inorganic materials that have pozzolanic or latent hydraulic binding effects are commonly used in cementitious materials. Hydraulicity is defined as "the property of limes and cements to set and harden under water whether derived from a naturally hydraulic lime, cement or a pozzolan". A latent hydraulic binder reacts in more slowly and due to a trigger in a particular manner in order to change the properties of cementitious products. It will come to a full strength on its own, while very slowly. These have the purpose of either stretching the need for lime clinker in the cementitious mineral admixture or improve the properties of the cementitious mineral admixture.

These have the purpose of either stretching the need for lime clinker in the cementitious mineral admixture or improve the properties of the cementitious mineral admixture.

While one of the most prolific man-made materials, cementitious structures like concrete, mortar and cement is notoriously permeable to fluids (liquids and gases), compromising their integrity and the isolation capabilities of the structures the materials make up. To amend the permeability of cementitious materials, slurries or solids are often modified with organic compounds like polymers and elastomers. Polymers and elastomers decay over time and frequently have concerns in terms of environmental safety. The discoveries of safe materials that make cementitious materials less permeable are therefore desirable.

Structures made from cementitious materials are frequently used to seal off reservoirs of fluids. Particularly, the sealing off gases emanating from the ground. These include cement sealing of underground gas reservoirs from petroleum and geothermal energy extraction, radon gas barriers of buildings, and the long term sealing off storage of hazardous waste emitting gas. Well integrity problems due to degraded cement sheaths are a known cause of leaks through active and abandoned wells. Development of an improved well plugging material that hinders leakage through well plugs is likely to have major positive environmental impact, as it improves long-term well integrity and reduces leakage to the environment. Our invention, as a cement additive material added to cementitious mineral admixture materials, magnesium-iron silicates will increase the cement-plug lifetime for the drilling, abandonment of oil and gas wells in general, but also those penetrating present or future carbon-dioxide storage reservoirs. Current practices on P&A involve massive retrieval ("pulling") of steel tubulars. This is an environmental work hazard due to the application of rotating methods (cutting/milling) that can threaten workers, all the while very costly in rig time.

Permeability

The ability for fluids (gas or liquid) to flow through rocks/cement is permeability. The flow rate is related to the material's density. For a liquid, the density is almost independent of conditions. For gases, the densities depend upon pressure, temperature and also but less on composition and extent. Dependent upon pressure and temperature the gases change volume as they are compressible. In addition, the rate of flow through a material is highly dependent on the viscosity of the fluids passing through the material.

The permeability is the property of solid materials that is an indication of the ability for gas or liquid to flow through it. Permeability comes about through the connectivity of pores in a solid. While a material can be very porous, the pores may not be connected, and the permeability can be low. An example is foamed materials. Likewise, a dense material with few pores can have distinct cracks that allow the fluids to flow through it. An example is shrinkage cracks that form along the boundaries to other solids, called Micro annuli for wells.

Gas migration through a cementitious material is known to be a major issue in petroleum and geothermal wells, and also is a worry for the isolation of hazardous materials. Once the gas migrates through the material, it can not only pass through but create dissolution pathways that later gas can pass through causing harmful leaks. The primary pathway for gas to migrate long term, after the cement has set and cured, is through the cracks towards the surroundings, in well cementing called the micro annulus.

A sealed reservoir of a fluid (liquid or gas) must withstand differential pressure across the reservoir, as the direction and rate of flow is related to the pressure difference in reservoir zones, between reservoir and well etc. It is therefore highly desirable that cementitious structures that are to be used to seal a reservoir be able to tolerate high values of differential pressure.

Cement slurry design is affected by e.g. depth of the well because depth influence on temperature, hydrostatic and friction/shear pressure/stress, which type and volume of wellbore fluids. Well hole size and casing size varies also with depth.

Darcy's Law

The physics of flow through a porous media like those of cementitious structures are generally described by Darcy's law:

$$Q = -\frac{kA(p_b - p_a)}{\mu L}$$

The discharge or flow, Q (m3/s), is equal to the product of the intrinsic permeability of the medium, k (m2), the cross-sectional area to flow, A (units of area, e.g., m2), and the total pressure drop (pb−pa) (pascals), all divided by the dynamic viscosity, $\mu$ (Pa·s), and the length over which the pressure drop is taking place L (m).

Permeability is measured in Darcy. 1 Darcy=1000 Millidarcy (mD). Concrete can have a permeability between 0.1 mD-1 mD to small gases such as nitrogen. Cement may be designed to sustain permeability issues, by for example adding superfine amorphous silica with expanders (Periclase mineral powder) that makes the blend very costly.

Fluid and Gas in Wells

Gas communication through a cemented annulus has been recognized as a major problem for a considerable number of years. Previously gas migration in a wellbore was considered to exist only at the casing-cement or cement-formation interfaces, and bonding was considered to be a major cause for gas communication. This is still a major factor to contend with; however, it is not the only problem that may be responsible for gas communication between multiple permeable formations. Causes of gas migration through a cemented column. Factors found to be most important for prevention of gas migration were: 1. Mud-Cement Density (Effective hydrostatic head), 2. Cement Filtration Control, 3. Cement Viscosity or Gelation, 4. Borehole Mud Removal, 5. Setting Time or Temperature, 6. Pipe Movement and 7. Centralization.

Gas migration through cement has been a major problem in the drilling industry for the last two decades, while shallow water flow is a more recent problem. When shallow gas starts flowing it may be difficult to stop, and time-consuming squeeze cementing jobs become necessary. In many instances this type of flow has turned into blowouts. One can distinguish between three different paths to the surface:

through the wellbore,
through cement behind the casing,
through weakness in the sediments.

In ordinary cementitious materials, the cement sets and ceases to transmit hydrostatic pressure across the gas zone. By using magnesium-iron silicates as an additive material, the long-term hydrostatic pressure is maintained, reducing the probability of gas emanating through and causing harm.

Carbonation

The patent literature has many examples of cement mineral mixtures for producing concrete to defend the cement construction from a reaction with $CO_2$, named a carbonation process. Carbonation is a well-known reaction for all lime-cement mixtures and changes its mineral composition from CaO (lime) to $CaCO_3$ (Calcium carbonate) and this happens naturally over time due to weathering. The magnesium-iron silicates will also react with the $CO_2$ and the minerals formed due to carbonation will expand into gaps and cracks of the cementitious structure in order to keep the structure sealed.

Magnesium-iron silicates can be carbonized (e.g. altered by $CO_2$), and therefore will increase the cement-plug lifetime for the cement admixtures in wells when exposed to $CO_2$, particularly those penetrating carbon-dioxide storage (CCS) reservoirs. (FR-2.939.429). That patent shows features of the reaction of olivine with $CO_2$ producing magnesium carbonate, creating a self-healing cement in actual conditions in the well.

Below is an example of a carbonation process of the magnesium end member olivine reacting with carbon dioxide.

Carbonation

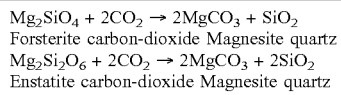

$Mg_2SiO_4 + 2CO_2 \rightarrow 2MgCO_3 + SiO_2$
Forsterite carbon-dioxide Magnesite quartz
$Mg_2Si_2O_6 + 2CO_2 \rightarrow 2MgCO_3 + 2SiO_2$
Enstatite carbon-dioxide Magnesite quartz The carbonation process example happens naturally, where $CO_2$ reacts with the forsterite endmember of the olivine solid solution series.

Hydration

An object of the present invention is to improve the properties of a cementitious mineral admixture by adding a pozzolanic or latent hydraulic binder that reacts through hydration i.e. with $H_2O$ and other aqueous solutions. There are a multitude of pozzolans and latent hydraulic binders used in the cementitious mineral admixtures containing lime (CaO), and water. Pozzolans include a number of natural and manufactured materials, such as ash, slag etc. The pozzolans impart specific properties to cement. Pozzolanic cements may have superior strength at a later age and may be more resistant to weathering.

The hydration reactions described here happen at the very low end of the pressure- and temperature range generally discussed in metamorphic petrology. Diagenesis, weathering and very low-grade metamorphism are the main processes. In geochemical reactions, an added forcing on a reaction can be geochemical instabilities, where minerals or solutions not in equilibrium seeks to react towards a steady state. In our invention, we are utilizing anthropogenically induced geochemical instabilities to induce low, very low-grade metamorphism, diagenesis and weathering. Over time, even olivine grains covered in an aqueous solution and left at room temperature will weather to alteration minerals.

Below is shown some of the reactions of end-member olivine (forsterite and fayalite) and orthopyroxene (enstatite and ferosilite) when hydrated in reaction with $H_2O$. It may occur according to these but not limited to the following reaction equations:

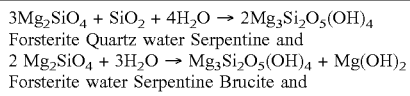

$3Mg_2SiO_4 + SiO_2 + 4H_2O \rightarrow 2Mg_3Si_2O_5(OH)_4$
Forsterite Quartz water Serpentine and
$2 Mg_2SiO_4 + 3H_2O \rightarrow Mg_3Si_2O_5(OH)_4 + Mg(OH)_2$
Forsterite water Serpentine Brucite and

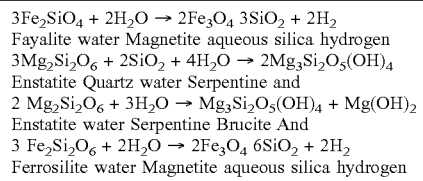

$3Fe_2SiO_4 + 2H_2O \rightarrow 2Fe_3O_4\ 3SiO_2 + 2H_2$
Fayalite water Magnetite aqueous silica hydrogen
$3Mg_2Si_2O_6 + 2SiO_2 + 4H_2O \rightarrow 2Mg_3Si_2O_5(OH)_4$
Enstatite Quartz water Serpentine and
$2\ Mg_2Si_2O_6 + 3H_2O \rightarrow Mg_3Si_2O_5(OH)_4 + Mg(OH)_2$
Enstatite water Serpentine Brucite And
$3\ Fe_2Si_2O_6 + 2H_2O \rightarrow 2Fe_3O_4\ 6SiO_2 + 2H_2$
Ferrosilite water Magnetite aqueous silica hydrogen note that forsterite is the magnesium endmember of the olivine solid solution series and fayalite would be the divalent iron endmember of the olivine solid solution series. an olivine with 90% forsterite would be assigned fo90. Enstatite is the magnesium endmember, and ferrosilite is the iron endmember of orthopyroxene solid solution series. An orthopyroxene with 90% enstatite would be assigned $En_{90}$. A solid solution mineral series allows cations of similar size and valency can be exchanged in the same location in the crystal lattice, based on the external forces that they are exposed to. For olivine and orthopyroxene in natural systems, the magnesium endmember indicates higher crystallization temperatures than the iron endmember does. Therefore, the mantle rocks predominantly exist of fo93-fo89 olivine and $En_{90}$ orthopyroxenes. Pure forsterite is rare in nature and Ferrosilite is only industrially made.

The purpose of the present invention is to utilize a similar reaction pattern of magnesium-iron silicates in hydration reactions (with water ($H_2O$) and associated aqueous solutions (e.g. brines)), in that the composition is used as enhancers in cementitious mineral admixture materials, as a pozzolan, a latent hydraulic binder, as a filler, for the use of producing amorphous silica in the latent reaction, and to provide a natural anti-fouling agent in cementitious concrete and/or mortar structures in general.

As disclosed above the present invention is a cement additive material that is a pozzolanic or latent hydraulic binder made from magnesium-iron silicates that improve the properties of a cementitious mineral admixture and the outcome of the products made from the admixture. Our product is a cement additive material that is a latent hydraulic binder that is activated through hydration and is intended for cementitious mineral admixtures for the purpose of reducing the gas permeability of structures produced over time.

Bonding of Cement

The quality of cured cement is commonly associated with the properties of cement materials and cement placement in the wellbore. The inner surface roughness of pipes affects cement plug sealing significantly. Very rough pipes significantly reduce the gas leak rate. Neat cement plugs vs silica cement system shows that neither produce a tight cement plug, and where silica cement systems comprising expanders is the tightest cement. However, the use of expanders would produce a better sealing performance.

In the silica cement when exposed to $CO_2$-saturated brine, the carbonation region consisted of two distinct layers with a rough interface region containing wormhole-like features. The formation of these two layers is proposed to be due to calcium carbonate dissolution and re-precipitation.

SHORT SUMMARY OF THE INVENTION

In a first aspect, the present invention relates to a cementitious mixture including: one or more divalent magnesium-iron silicate that in neutral or basic aqueous solutions have the capacity to be a latent hydraulic binder comprising 2% to 99% of divalent magnesium-iron silicate by weight of total hydraulic solid materials.

An aspect, discloses the use constructing solidified cementitious structures wherein the gas permeability is at most 1 µD, preferably 0.5 µD, more preferably 0.1 µD, even more preferably 0.05 µD, and most preferably 0.005 µD.

Another aspect discloses a cementitious slurry for reduced gas permeability that included: cementitious materials; water; and one or more divalent magnesium-iron silicate that in neutral or basic aqueous solutions have the capacity to be a latent hydraulic binder comprising 2% to 99% of divalent magnesium-iron silicate by weight of total hydraulic solid materials.

In another aspect, a method is disclosed which includes:
a) mixing cement with a cement additive that comprises an admixture of one or more of divalent magnesium-iron silicates with the capacity to act as a latent hydraulic binder to a cement mixture, said cement additive comprises 2% to 99%, of divalent magnesium-iron silicate by weight of total hydraulic solid materials;
c) blending the cement mixture to a neutral or basic slurry by the addition of water
d) making a structure from the cement mixture
e) allowing the structure to set.

An example, discloses the use constructing solidified cementitious structures wherein the gas permeability is at most 1 µD, preferably 0.5 µD, more preferably 0.1 µD, even more preferably 0.05 µD, and most preferably 0.005 µD.

In various examples of each aspect, the magnesium-iron silicate is by weight of total hydraulic solid is between 10% and 98%, 15% and 99%, 10% and 55%, 20% and 50%, 15% and 25%, 20% and 80%, or 20% and 60%. In further examples, the magnesium-iron silicate includes or consists of mineral group olivines, orthopyroxenes, amphiboles, serpentines, or a mixture thereof.

Background Discussion of the Water to Cement Ratio

The water to cement ratio, often designated W/C or w/c, is a very important factor in the forming of a cured product with the desired mechanical strength and durability. Additionally, pourability of the slurry is affected by the W/C ratio.

Abram's law illustrates that the strength of a concrete's inverse relationship to the W/C ratio:

$$S = \frac{A}{B^{(W/C)}}$$

Where S is the strength of concrete, A and B are empirical constants, and W/C is the water to cement ratio (varies from 0.3 to 1.2). This formula is most applicable for situations where there the cement does not contain special additives to overcome the issues surrounding W/C ratios of 0.3 to 1.2. One skilled in the art will be aware of this and calculate the predicted strength using other means and techniques. The most common industrial use of cement is in making concrete. The strongest concrete typically has a W/C ratio of 0.4 to 0.7. Also note that while concrete is a common application of cement, there are other applications (e.g. mortars).

High W/C ratios (indicating high water content) present special problems. While they are more pourable, the cured product has problems with strength. One cause of this is that as this leaves large pores in the cement structure as it dries. Another problem is that there is a large amount of shrinkage as the cement cures. Additives are typically added for W/C ratios over 0.7. The present invention is well suited for high W/C ratios because it both fills pores and expands as it cures.

Low W/C ratios (indicating high cement content) will normally lead to a stronger product, up until a point. However, water is needed to activate the chemical process itself. Without enough water, the cement will remain too dry; cured structures will easily break or crumble. Additionally, with low W/C ratios, the slurry can become almost impossible to pour. A common solution has been to use special additives (e.g. plasticizers) to solve these problems.

This is a practical way to describe a slurry or a method of making a slurry, but it may not be the easiest way of describing a dry mix with an additive present that is often added with the water itself.

Once a specific W/C ratio is established for a given application, this can be used to describe the additive percentage in terms of weight of cement, rather than weight of water. An example of this calculation is given for a W/C ratio of between 0.3 and 1.2 for an additive range of between 0.7% to 10% by weight of water.

$$[\text{Additive}] = 0.7\% \text{ of the weight of water}$$

$$0.3\frac{W}{C} = 0.3\frac{\text{weight of water}}{\text{weight of cement}}$$

$$[\text{Additive}] = 0.7\% \text{ by weight of water} * 0.3\frac{\text{weight of water}}{\text{weight of cement}}$$

$$= 0.21\% \text{ by weight of cement}$$

$$[\text{Additive}] = 10\% \text{ by weight of water} * 1.2\frac{\text{weight of water}}{\text{weight of cement}}$$

$$= 12\% \text{ by weight of cement}$$

In this manner, the weight of the additive can be expressed as a percentage of the weight of cement or of the weight of water.

Purposes and Advantages of the Present Invention

One of the advantages of the present invention is that it results in a cement structure that has drastically lower permeability values to both large and small gases when compared to traditional types of cement.

Ordinary petroleum well cements are based on the principles of Portland Cement. As NORSOK D010 and API Spec 10A are the current industrial standards for operations in the oil and gas industry, it was important that the present invention is able to meet those standards in an affordable manner. Of particular advantage of the present invention is that it easily added to current well cements operations to improve performance and meet standards. Many of the advantages of the present invention are apparent in the application of well cementing and completing, plugging, temporary and permanent abandonment of wells, including $CO_2$ injector wells and acidic ($CO_2$) and sour ($H_2S$) wells.

Industrial and private buildings in areas that need to have increased gas proofing. Radon proofing and sealing off the base of buildings in areas that have gases emerging from the ground. Sealing off tunnels and pipelines that contain some gas. Sealing off potable water wells that pass through gaseous zones.

The present invention solves the above-mentioned deficiencies. One skilled in the art will also note that the present invention also provides other advantages and solves other technical problems than those that are explicitly disclosed above or later in this document.

DESCRIPTION OF THE FIGURES

The above and further features of the invention are a set forth with particularity in the appended claims and together with advantages thereof will become clearer from consideration of the following detailed description. Embodiments of the present invention will now be described, by way of example only, with reference to the following diagrams wherein:

DESCRIPTION OF EMBODIMENTS OF THE INVENTION

Reference will now be made in detail to the present embodiments of the inventions, examples of which are illustrated in the accompanying drawings. Alternative embodiments will also be presented. The drawings are intended to be read in conjunction with both the summary, the detailed description, and an any preferred and/or particular embodiments, specifically discussed or otherwise disclosed. This invention may, however, be embodied in many different forms and should not be construed as limited to the embodiments set forth herein. These embodiments are provided by way of illustration only. Several further embodiments, or combinations of the presented embodiments, will be within the scope of one skilled in the art.

Direction terms such as up, down, left, right, above, below, etc. are being used in reference to the orientation of the elements in the figures. In no way is this intended as limiting.

This invention is an extension of previous work with a cementitious material that seal off liquids and gasses. However, we have found that the materials are significantly better at sealing off gaseous materials than previously predicted or expected. While liquids and supercritical fluids are in the reservoirs of petroleum systems at crustal pressures and temperatures, the phase transformation from liquid to fluid can bring on a major pressure release. This e.g. can occur when liquids in the reservoir zone under pressure flows toward and into the well with less pressure. This invention works well for salt-water or fresh water used in mixing the slurry.

At formation pressures and -temperatures a gas may be transformed to a supercritical fluid. An example is $CO_2$ gas, which becomes supercritical at temperatures above 31° C. at a pressure of 73.8 bar. Supercritical fluids have a viscosity similar to a gas but a density similar to the corresponding liquid.

Permeability is dependent on the viscosity of the gas or fluid that is flowing through the matrix. Therefore, the properties of the supercritical fluids are similar to the properties of the corresponding gas in this invention. The supercritical fluid of a gas molecule (e.g. $CO_2$, $H_2S$, $N_2$, $CH_4$) will behave roughly same as a non-supercritical fluid of a gas molecule with regards to the reduced permeability properties of the invention.

The inventors observed that very low concentrations of magnesium-iron silicate may have properties that are significant for operations that need blends very close to ordinary blends, while exploiting gas proofing. Likewise, blends that are nearly all magnesium-iron silicates with a small concentration of cementitious materials will potentially need longer to set but will have a much lower permeability once set. As mentioned previously, the inventors observed that magnesium-iron silicates provided self-healing characteristics. However, the reduction in permeability was incredibly surprising even in the face of the potential self-healing properties.

Figure 6B:
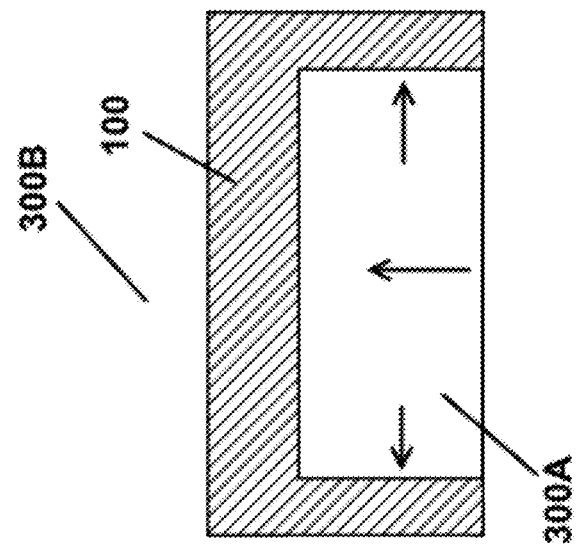
FIG. 6B discloses a structure surrounding a gas source.
Figure 6A:
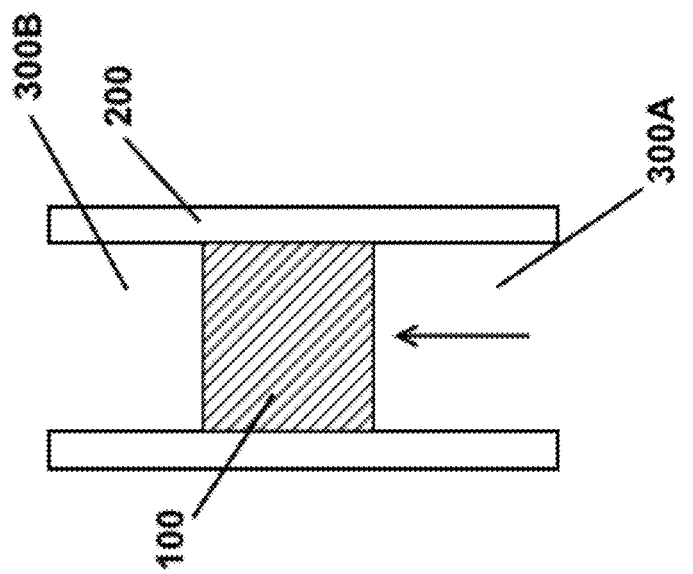
FIG. 6A discloses a structure inside a hollow container.

FIGS. 6A and 6B disclose schematically how a structure made from the inventive mixture can be used in different circumstances for creating a gas proof structure. In both figures, the arrows represent a gas pressing against the cementitious structure 100. In FIG. 6A, a hollow container 200 (e.g. pipe or production casing) has a cementitious structure 100 (e.g. plug) bonded to the inside of it. This creates a first region 300A and a second region 300B where gas does not transfer (or move) from one region to the other 300A/300B. This is a common method that could be used in the case of needing to plug a hydrocarbon well during plugging and abandonment (or carbon capture and storage). FIG. 6B discloses an example where the cementitious structure 100 is not inside of a pipe. Instead, it is shown as surrounding a gas source. This prevents the gas inside of the structure 100 from moving from the first region 300A to the second region 300B.

Though FIGS. 6A and 6B indicate that there is gas pressure on a single side of the cementitious structure 100, this is by way of example only. The invention could be used to keep two or more sources of gas separate if desired.

The invention is well suited for use in making plugs and other cement structures to prevent gas from moving or flowing into areas where it is not wanted.

The term "gas proof" refers to a structure having a low enough gas permeability that, ideally, a gas cannot cross from one region to another. However, depending upon the application, a gas permeability lower than an accepted threshold will be considered sufficiently "gas proof".

Carbon Dioxide Experiments:

Numerous experiments were performed to measure the permeability of a cement structure (e.g. plug) to water saturated with carbon dioxide. Note that usually a cement plug will be about 100 times more permeable to gas than it is to a liquid.

Carbon Dioxide Experiment 1

Previous work in U.S. Ser. No. 10/774,001 has shown that a mixture including olivine has properties related to self-healing in the presence of water or carbon dioxide. This includes a disclosure of reduction of permeability after a multiple day exposure to water saturated with CO2. This was thought to be due to water or saltwater being carried into the pores and voids and triggering the "self-healing" reactions that result in matter being precipitated there.

Figure 1A:
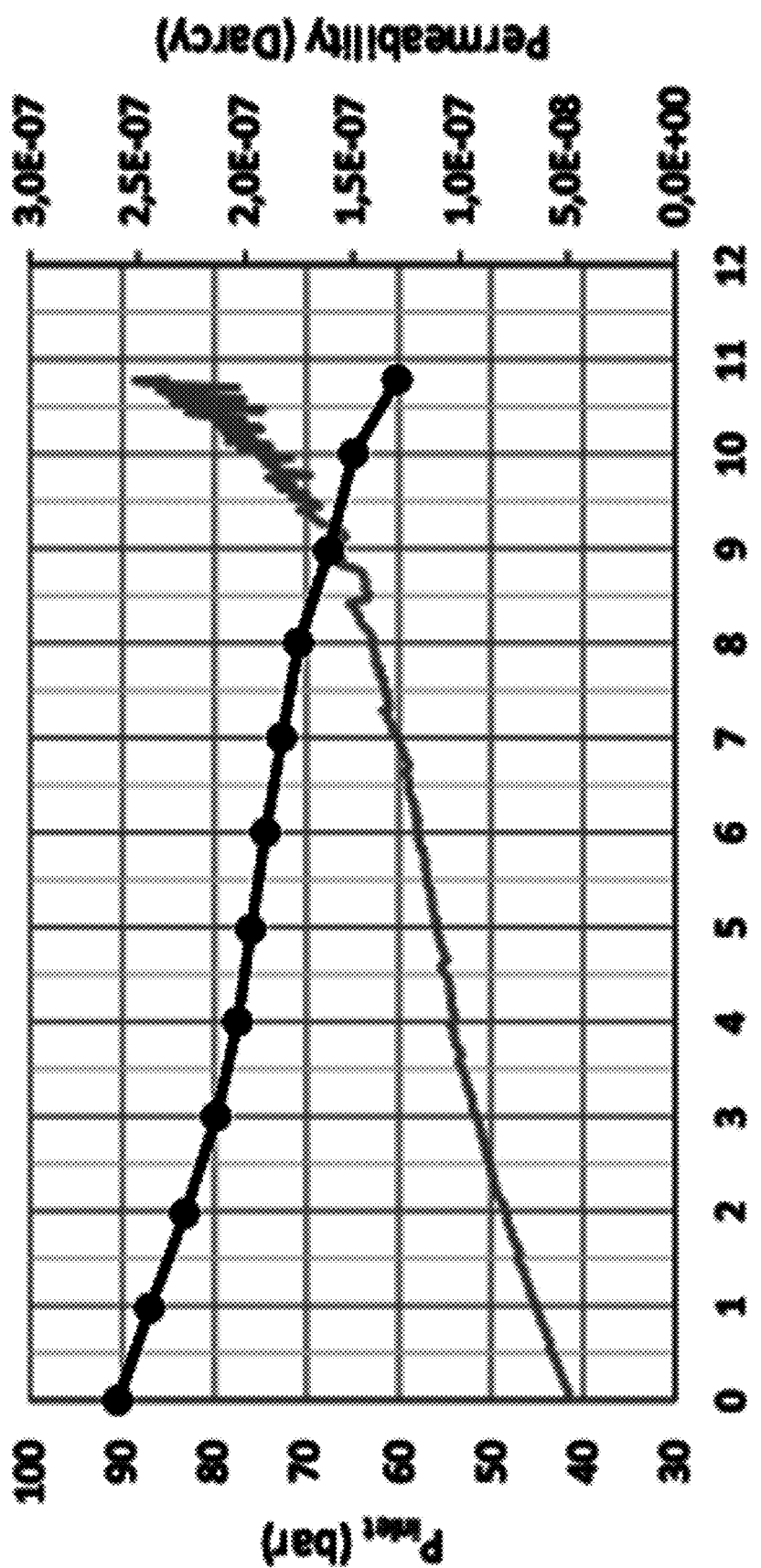
FIG. 1A discloses results for a water saturated carbon dioxide with permeability experiment.

The results of such an experiment are shown in FIG. 1A. This experiment was performed using 20% of olivine by weight. The sleeve volume was pressurized with 50 bar of nitrogen, and the core outlet was connected to a burette for collection of gas. Leakage of gas through the sleeve was monitored for a period of 24 hours. Finally, nitrogen was displaced with a viscous paraffin at a constant pressure of 50 bars. The paraffin was injected from the bottom and nitrogen was bleed off from the top via back pressure valve.

Prior to injection, the core sample was heated to a stable temperature of 60° C. and pressurized to a confining pressure of 110 bar, where both parameters, where kept constant throughout the experiment. Seawater (saturated with $CO_2$) was subsequently injected into the core with a high pressure Quizix piston pump. Flow rate was set at low as 360 microliters/hour, and back pressure was set to 10 bars. Differential pressure was measured at steady state conditions at each rate, and permeability calculated according to Darcy's Law.

An additional, a long-term seawater test was conducted, and the permeability calculated. The initial permeability was 0.26 μDarcy. After nearly 11 days of brine flooding and 45 ml of seawater injected, the permeability reduced to 0.129 μDarcy, as shown in FIG. 1A. The line with filled circles represents the permeability and the smooth line represent for the injection pressure.

Carbon Dioxide Experiment 2

Figure 1B:
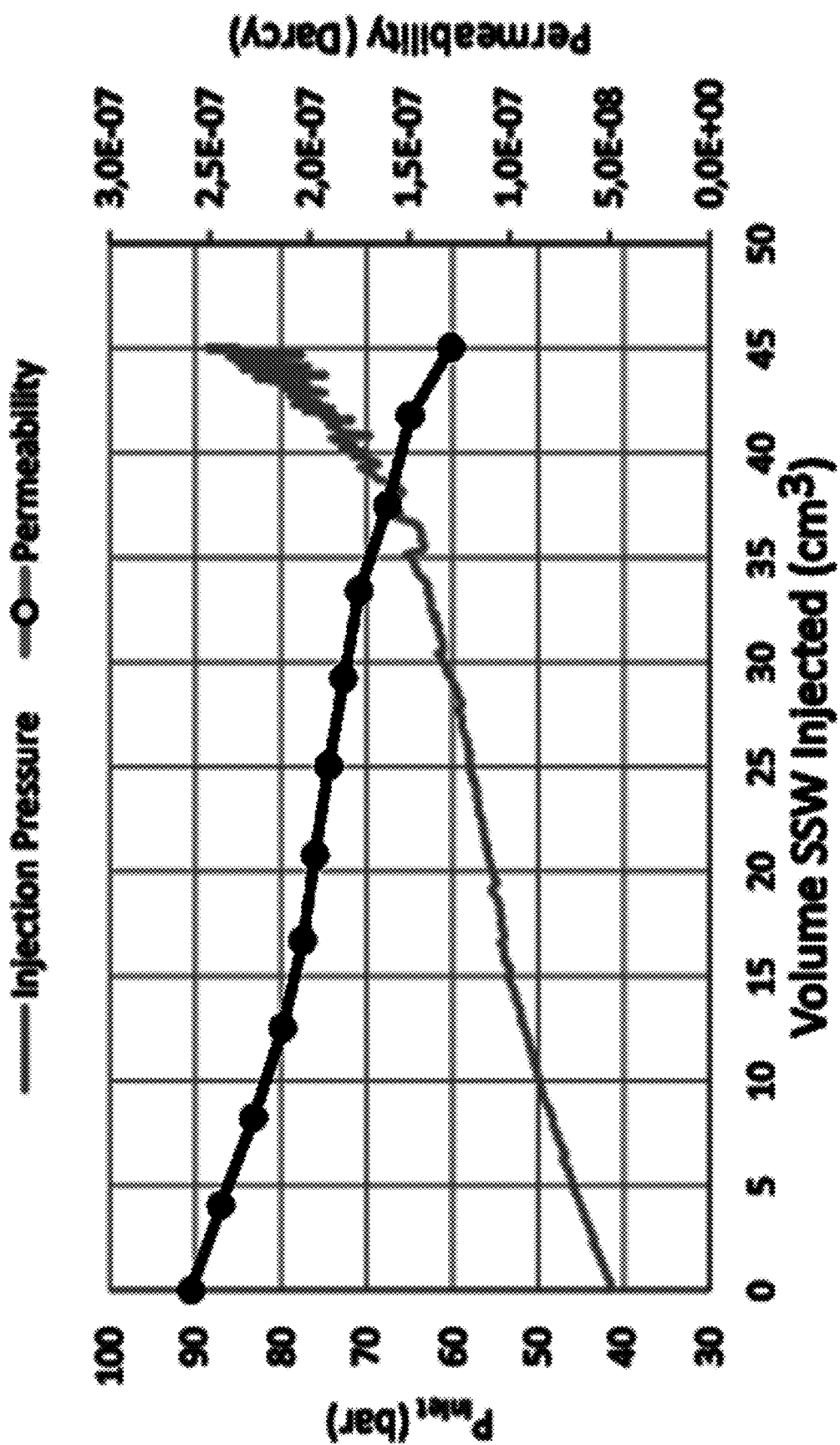
FIG. 1B discloses results for a water saturated carbon dioxide with permeability experiment.

An experiment was performed where sea water saturated with carbon dioxide was forced through the sample as it cured. The results are shown in FIG. 1B, where "Volume SSW Injected" stands for the volume of saturated seawater was injected into the test rig. Of interest in both FIG. 1A and FIG. 1B is the behavior of the solid line that represents the injection pressure. As can be seen, in FIG. 1A, at around 8.5 days, the injection pressure begins to vary in an erratic manner. This behavior is also observed in FIG. 1B around 35 of SSW injected. This is due to the cement having cured to a point where the gas cannot pass through the sample in a controlled manner. This is very apparent when looking at the variation in the injection pressure of days 10-11. The gas simply cannot pass through the sample in an appreciable manner. At this point, the sample is so impermeable that it makes the pressure build up and release in busters. This was causing the test rig to start jumping. These show that the permeability is being reduced to a surprisingly low degree.

Carbon Dioxide Experiment 3

Another experiment was performed that studied the results of permeability to brine that was saturated in CO2. Batch $CO_2$ exposure was performed for seven days in an autoclave at 90° C. and 280 bar. The cores were submerged in 1.0 wt % NaCl-brine and dry $CO_2$ was pumped in from the inlet at the top of the autoclave, forming a gas cap and ensuring that the brine was saturated with $CO_2$. No brine was added or replaced during the exposure.

Porosity before and after $CO_2$ exposure for batches with different percentages of the magnesium-iron silicate (olivine in this case) as shown in Table 1 below:

TABLE 1

Initial and final porosity after $CO_2$ exposure as estimated from CT results.

| % Olivine | Core Number | Initial Porosity | Final Porosity | % Reduced |
|---|---|---|---|---|
| 20% | 4 | 0.5 | 0.1 | 80% |
| | 5 | 1.2 | 0.4 | 67% |
| | 6 | 0.75 | 0.3 | 60% |

TABLE 1-continued

Initial and final porosity after $CO_2$ exposure as estimated from CT results.

| % Olivine | Core Number | Initial Porosity | Final Porosity | % Reduced |
|---|---|---|---|---|
| 35% | 5 | 0.8 | 0.2 | 75% |
| | 6 | 0.4 | 0.05 | 88% |
| 50% | 4 | 0.6 | 0.1 | 83% |

This again shows the ability of the present invention to greatly reduce the permeability of cement to CO2 across the percentage ranges of the magnesium-iron silicate. It would be expected that the results would extend over a wider range.

Carbon Dioxide Experiment 4

Figure 2:
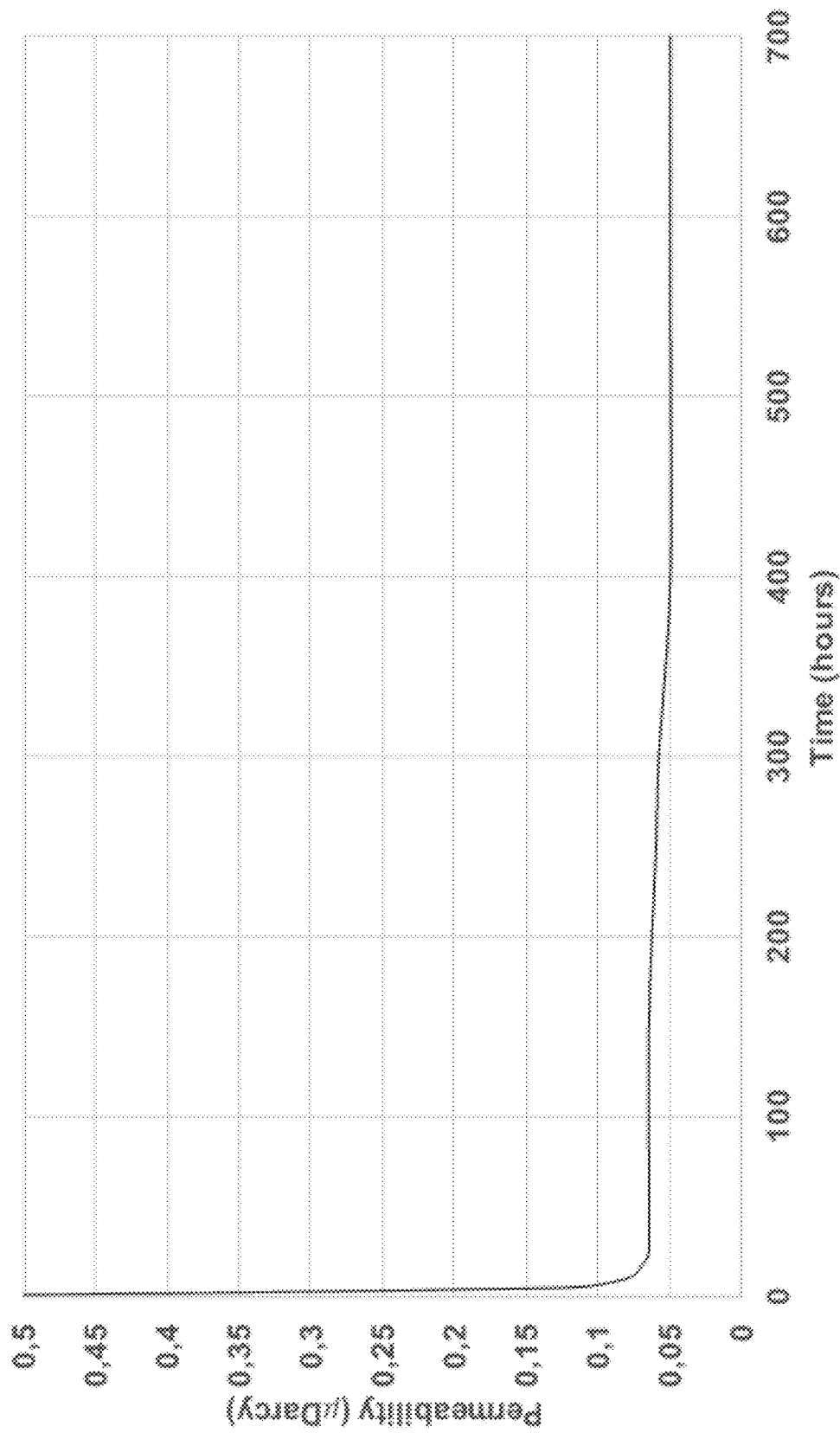
FIG. 2 discloses results for a water saturated carbon dioxide with permeability experiment.

Reference is now made to FIG. 2. Experiments were run to measure the permeability of cured cement to carbon dioxide. A blend of cementitious materials containing 19.6 wt % out of total solids of olivine, and water added as required, was blended by the normal API 10A Standard methods. The materials were cemented into a sleeve, cured under pressure for one week at 60° C. Water was then flooded through the sample. After about 100 hours, CO2 was added to the water, resulting in a steady decline of the permeability of the sample. The measurements of the flow through the cement was made in ml/min resulting in very small numbers with a lot of variability in the measurements. Opening chambers for operational procedures also resulted in spikes and troughs in the measurements. This noise and variability is omitted for clarity. The final permeability of the same was below 0.05 μDarcy.

Carbon Dioxide Experiment 5

In an experiment, solid cementitious mineral admixture products were fabricated based on a mixture of 80% Portland cement, and 20% olivine (which is a divalent magnesium-iron solid solution silicate) by weight, and water having an ordinary W/C number (W/C=water to cement ratio). The fraction of olivine was 0.2 with denatured water added. A solid cementitious mineral admixture cylinder was prepared and flooded by a seawater analog brine for a period of eleven days. The changes of permeability was measured throughout the experiment and the porosity was evaluated before and after the experiment by using a CT scanner.

The measurements showed that porosity of the product, when applying the inventive cementitious mineral admixture was reduced by as much as 55%, and permeability went down by 70% after said just eleven days exposed to brine. The experiments show that the gas permeability of the resulting cement decreased.

Nitrogen Experiments

We will now discuss a series of different permeability experiments using nitrogen gas. For these experiments, the gas will not be dissolved in water. This is a different type of experiment than has been performed previously.

As discussed previously under Carbon Dioxide Experiment 1, when water or saltwater is forced into the body of the solidified cement plug, the self-healing reactions cause the pores to fill with new material. However, in experiments that do not have an appreciable amount of water, this cannot be the case.

Any reduction in permeability of the cement to a gas which is not dissolved in water, is not expected in light of previous work with this inventive mixture for self-healing. Note that the amount of water vapor that can be dissolved in nitrogen is very low and will not significantly contribute reducing permeability through self-healing.

Nitrogen Experiment 1

Figure 3:
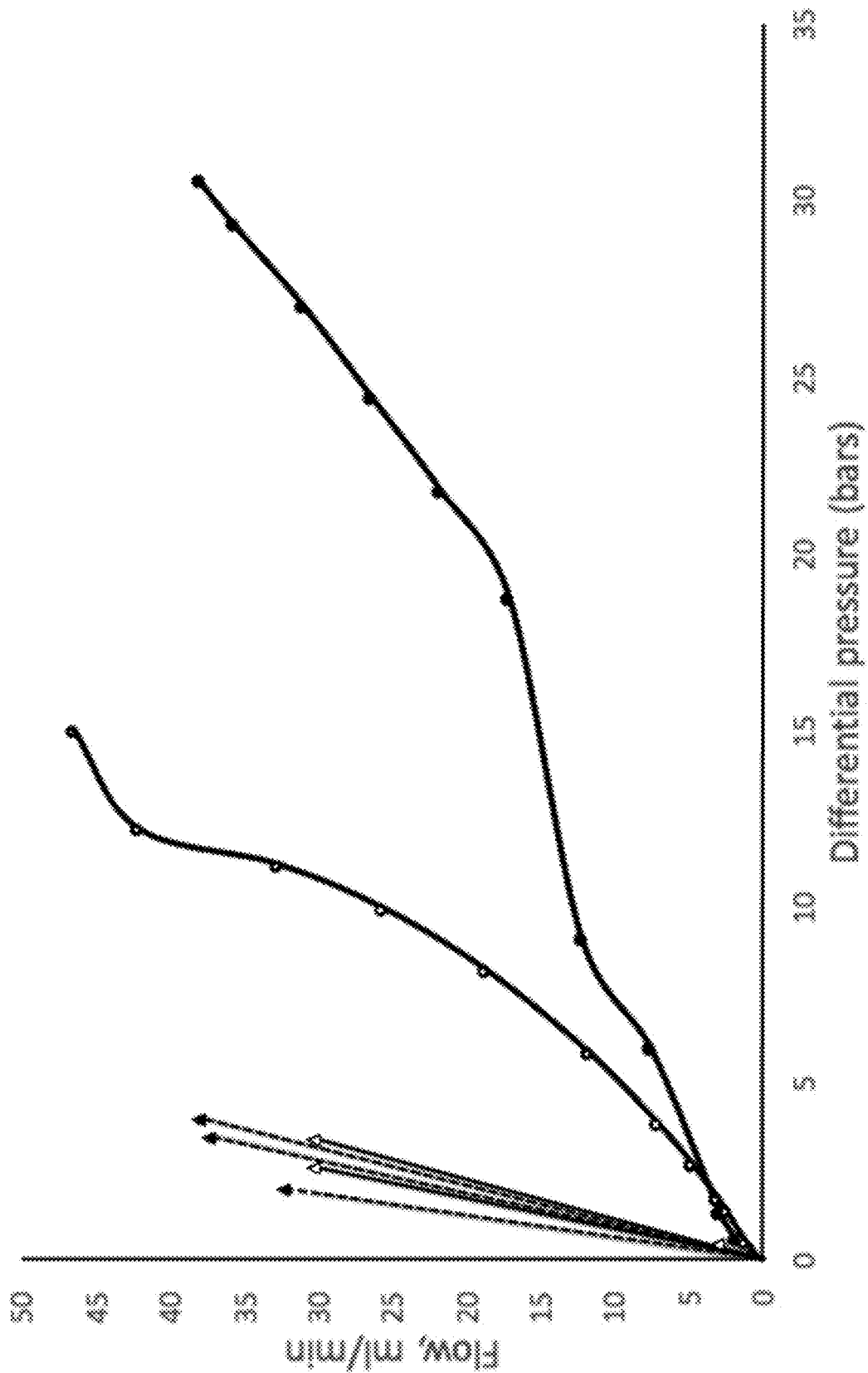
FIG. 3 discloses experimental results for permeability of silicate added cement and the cement of the present invention to nitrogen.

Reference is made to FIG. 3. These are the test results as described in SPE/IADC-194158-MS, where the Neat cement and the Silicate added cement shows high flow at low differential pressures, while the present invention over displays a significantly lower flow rate over the same differential pressures (Test A and Test B). Test A is represented by open circles and a solid line, Test B is represented by closed circles with a solid line, neat cement is represented by an open triangle, and silicate added cement by a closed |triangle. The vertical axis is the flow rate in ml/min and the horizontal axis is differential pressure and is in units of bars.

A study published in SPE/IADC-194158-MS, shows how neat cement cured at 66 degrees C. and silicate added cement cured at 120 degree C. inside a smooth casing tube under pressure, the cement was cured for four days and then $N_2$ was allowed to be pushed through the cement-casing apparatus. The study indicated that neat and silicate added cement had fairly significant leaks through the experiment and was not a good seal against flow of $N_2$ at even low differential pressures. The authors of the paper indicated that "Both cement systems, neat cement and silica cement, cured at their optimum temperature are not sufficient to produce a tight seal plug. Leak path development at the interface is consistent with shrinkage mechanism during hydration."

The inventors replicated this experiment using 66 degree Centigrade and 20% of the finely crushed olivine with 80% Portland cement in the mixture. The results are shown FIG. 3. Test A and Test B indicate far superior sealing capacity of the material, even without adding expanding materials or other pozzolans. This shows that adding magnesium-iron silicates, in particular olivine, will cause a continued hydraulic pressure towards the surrounding material providing a superior gas sealant for as long as the mixture has magnesium-iron silicates present.

It can be shown that the permeability of a sample is inversely proportional to the square of the differential pressure. FIG. 3 shows that the best differential pressure achieved in by a sample of neat cement or a silicate cement is about 4 bar. Test A achieved a differential pressure of about 15 bar and Test B of about 30.5 bar. These indicate that the permeability of the cement of Test A was about 7% and Test B about 1% that of the neat/silicate cement.

Nitrogen Experiment 2

An experiment was conducted over a range of pressures in order to establish the difference between the present invention and Portland G cement. Each were made using a standard process and a standard water to solid ratio.

The setup consists of a custom-built test cell 10 containing the cement plug placed inside a heating cabinet for temperature control, and a process board located outside the heating cabinet with the process tubing, valves, flow meters, pressure indicators, an automated pressure regulator and an automated logging system. A technical drawing of the test cell 10 is shown in FIG. 4. The major components of the test cell are:

Bottom cap 2 with two Swagelok ⅛ " connection ports 21 and a built-in movable teflon piston 23 used for retaining 22 the cement slurry during curing.

Expandable steel pipe 1 with inner diameter of 50 mm, wall thickness of 13 mm and a length allowing a maximum of 460 mm of cement to be placed inside the pipe.

Top cap 3 with two Swagelok ⅛ " connection ports 31.

A pressure test at 100 bar and 22° C. was performed on the test cell showing no signs of deformation on pipe diameter or damage to the pipe threads.

The test setup is also equipped with a temperature probe for control of the experimental conditions. The output data from the tests is the differential pressure needed to observe breakthrough of gas through the cement plug, and the relationship between the measured flow rate and differential pressure across the cement plug. Possible manipulated variables for the test setup can be the cement type and casing surface properties.

Before every new experiment, a pressure test was performed on every new test cell. This was done by fully mounting the test setup with no cement inside the cell. The setup would then be pressured up to the working pressure (20 bar) and the main valve to the pressure bottle would be closed. By monitoring the decrease in pressure over a period of 1-2 hours, the level of gas leakage from the entire setup was monitored. In an ideal situation there would be zero leakage; in a case of losing more the ~1 bar over 1 hour an attempt to localize the leakage would be performed. If the pressure test was assessed to be successful, the gas in the setup would be evacuated and the top cap to the test cell would be unscrewed.

The cement placement was performed by moving the teflon piston in its top-position and by pouring the designated cement volume into the test cell. All valves would be opened, and the automated pressure regulator would be set to maintain a minimum pressure of 20 bar. The top cap would be screwed in place tightly and the cell would be carefully pressurized to 20 bars. The cement plug would be left to cure at 20 bar and 66° C. for 5 days.

The cement plug integrity test started by moving the teflon piston down, leading to an open volume above and below the cement plug. By closing a valve, the two chambers would be isolated from each other and the only connection between them could be through the cement plug. By using the automated pressure-regulator a controlled differential pressure across the cement plug was generated. When the differential pressure was large enough for enabling flow through the cement plug, the pressure regulator connected to the bottom chamber would detect a decrease in pressure, and the regulator would try to maintain the set pressure. This flow of gas from the gas bottle through the process line would be detected by the flow meters. A sequential increase in the differential pressure would be applied to the cement plug. Thus, each experiment gives the pressure differential to which there is gas breakthrough the cement plug, and the relationship between the applied differential pressure and the flow rate through the cement plug. Figure (The one with the data) shows the raw data of flow rate and differential pressure plotted versus time for one of the experiments. For the data analysis and presentation of data stable values of the flow rate and differential pressure would be extracted and plotted against each other.

Test samples were made using 0%, 20%, and 80% of olivine by weight of total cementitious solids. The results of this are shown in the table below:

TABLE 2

Permeability of Sample/Permeability of net Portland Cement

| % of Magnesium-Iron Silicate | Pressure (bar) | Permeability Relative % to Portland Cement |
|---|---|---|
| 20% | 1.014 | 4.0% |
| 20% | 1.073 | 4.6% |

TABLE 2-continued

Permeability of Sample/Permeability of net Portland Cement

| % of Magnesium-Iron Silicate | Pressure (bar) | Permeability Relative % to Portland Cement |
|---|---|---|
| 20% | 1.084 | 3.4% |
| 20% | 1.084 | 1.9% |
| 80% | 1.620 | 1.7% |
| 80% | 1.223 | 1.5% |
| 80% | 1.590 | 1.0% |

This clearly shows the improvement of the present invention when compared to Portland G for permeability to nitrogen over a wide range of pressures.

Nitrogen Experiment 3

Figure 4A:
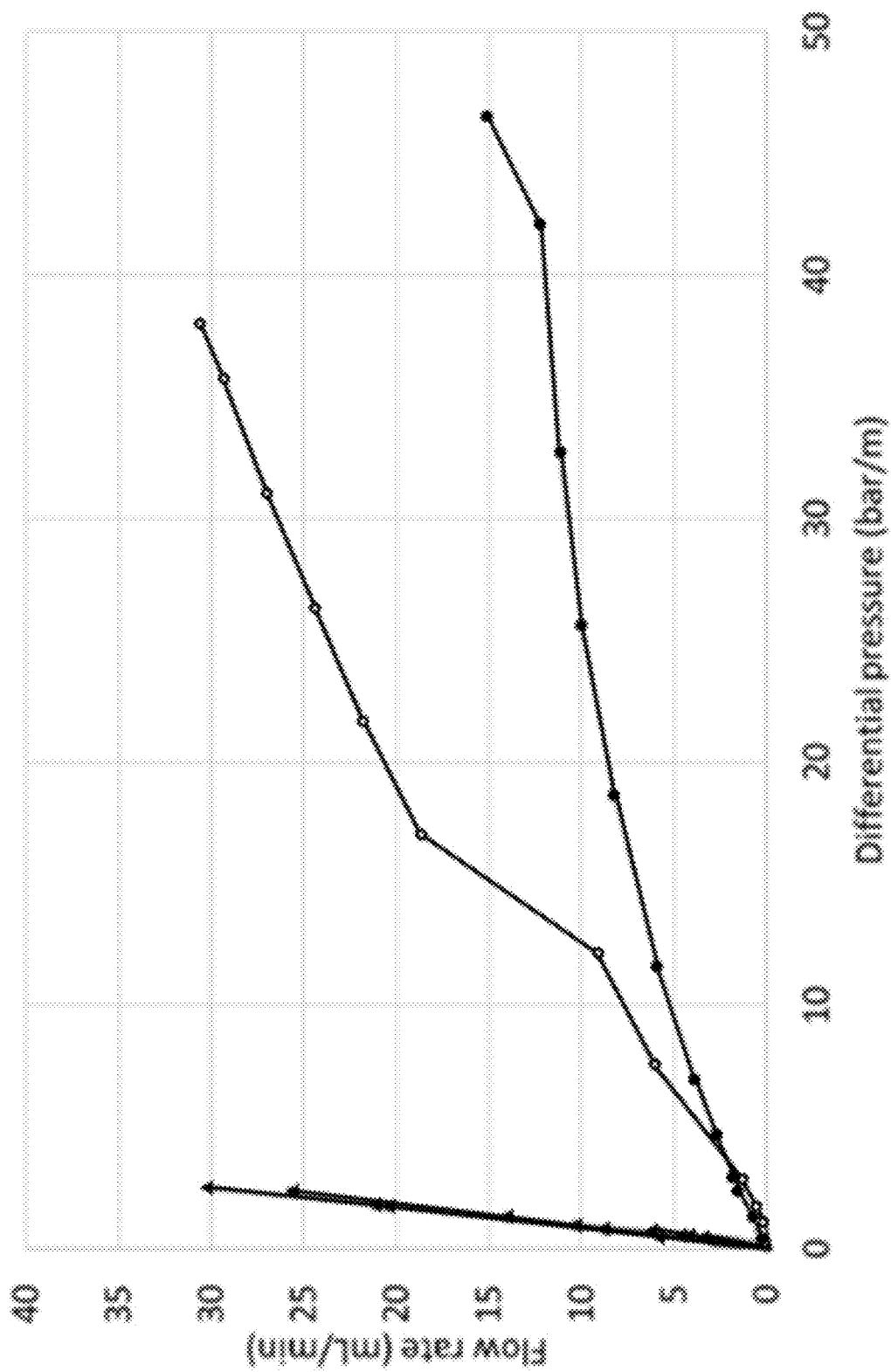
FIG. 4A discloses results for a nitrogen permeability experiment.
Figure 4B:
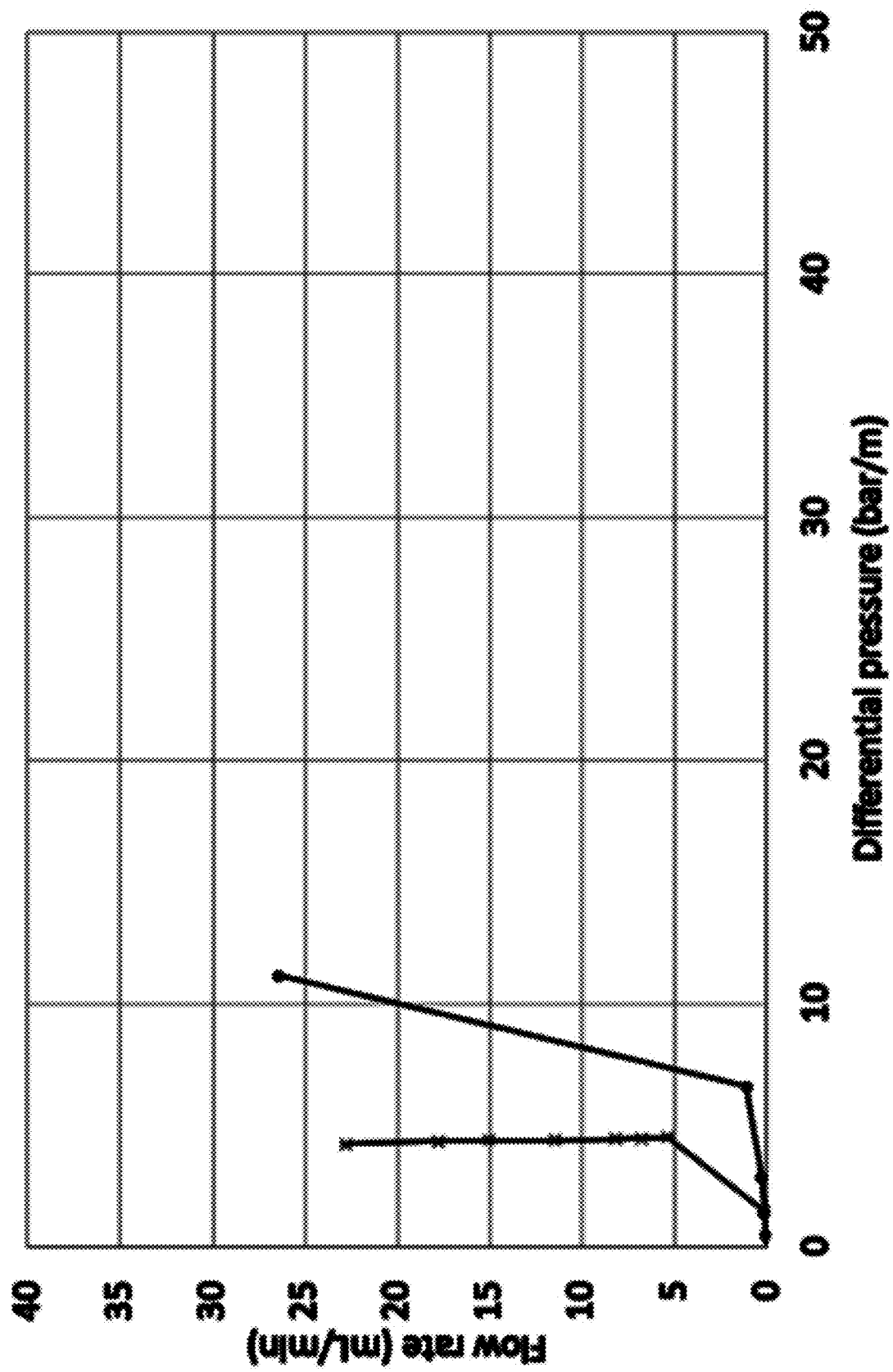
FIG. 4B discloses results for a nitrogen permeability experiment.
Figure 5:
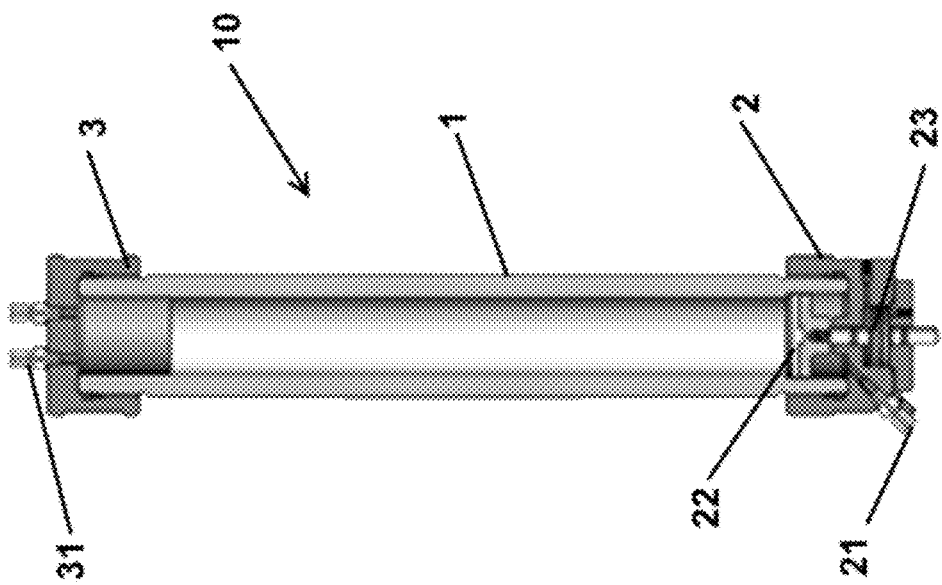
FIG. 5 discloses a test rig of measuring nitrogen permeability in nitrogen experiments 2 and 3.

Reference is now made to FIGS. 4A and 4B. Experiments were run to measure the permeability of cured cement to nitrogen. One set of experiments were made with repeated runs of 20% magnesium-iron silicate and 80% Portland G cement, measured by weight of dry materials. The other set was made with repeated runs of 80% magnesium-iron silicate and 20% Portland G measured by weight of dry materials. In both sets of experiments, the solids were mixed neat with water (in a water-to-solids ratio of 0.44) and the slurry was poured into a test chamber where the materials were cured.

The setup for a cement plug test consists of a custom-built test cell containing the cement plug placed inside a heating cabinet for temperature control, and a process board located outside the heating cabinet with the process tubing, valves, flow meters, pressure indicators, an automated pressure regulator and an automated logging system.

The results of the 20% magnesium-iron silicate tests are shown in FIG. 4A. The lines on the left most side of the figure are from samples of regular Portland G (marked with a filled triangle). These show that it does not take a high differential pressure to get a high flow rate through (or around) the sample.

Compare those to the two other lines on FIG. 4A. Each of these represent a different test run (test run A with solid circles and test run B with open circles). It was surprising that one of the 20% samples can tolerate over 12.5 times as much differential pressure to reach a 30 mL/min of flow rate. The second sample performed even better. Even at a differential pressure of 45, the flow rate is half of the other samples. Notice that the result shows that the cement is almost impermeable to nitrogen, even under a large pressure differential. In fact, the test ring was not able to supply enough pressure in order to achieve the same flow rate as the other samples. A simple regression of the data estimates that it would take a differential pressure of over 110 bar/m to cause the same flow rate through the sample (tolerating over 36.5 times as much differential pressure than the reference samples).

Reference is made to FIG. 4B. FIG. 4B shows the results of the tests of FIG. 4A using samples with 80% magnesium-iron silicates. Both of these tests (test A with a closed circle and test b with an asterisk) show an improved behavior when compared to the Portland G to differential pressure.

It can be shown that the permeability of a sample is inversely proportional to the square of the differential pressure. FIGS. 4A and 4B demonstrate that the present invention makes cured cement with a surprisingly lower permeability to nitrogen when compared to Portland G cement.

Nitrogen Experiment 5

The permeability of a solidified test sample from the present invention was measured using an apparatus as disclosed in Appendix B-4.11 ("Permeability") of "Well Cementing", second edition, edited by Erik B. Nelson and Dominique Guillot. This type of test apparatus and setup is well known in the industry where cement permeability to gas needs to be measured.

The samples had a measured permeability of between 0.03 µD and 0.006 µD to nitrogen gas.

As nitrogen gas has a very small diameter, it is expected that molecules of approximately the same size (e.g. methane) or larger molecules (e.g. carbon dioxide) will also behave similarly.

It is a very surprising for such a large reduction of gas permeability. The present invention should be able to achieve solid structures with a gas permeability of at most 1 µD, preferably 0.5 µD, more preferably 0.1 µD, even more preferably 0.05 µD, and most preferably 0.005 µD.

Something that must be kept in mind is that gases have, in general, viscosities (compared to liquids) that indicate that if a low viscosity gas is not passing through, then the higher viscosity gas will not pass through (per Darcy's law). In other words, if nitrogen gas does not have the possibility to pass through the pores of the cement it will not be possible for gas types (e.g. CO2, CH4, and H2S being some of the most important) to pass through the pore pathway (e.g. permeability) of the cement.

Additionally, this behavior will be the same if the cement is in saltwater or freshwater. Nitrogen does not dissolve appreciable in water, and salt would not change this situation, so it is readily apparent that the results of the nitrogen experiments can be extended to saltwater. It is well known that saltwater will degrade the structure of regular cement. Using freshwater causes less of this degradation. While it is surprising how well the present invention performs in saltwater, there is no reason to assume that it will not perform as well or better in fresh water. It is expected that water has a chloride concentration of between 0.4% to 14% by weight of water would not appreciably affect the previously presented permeability results. The most common saltwater that are found has a chloride concentration of between 0.7% and 10% by weight of water. Freshwater sources will normally have a chloride concentration of less than 250 mg/L.

For guidance of one skilled in the art, the table below gives the percentage of magnesium-iron silicates in the solid mixture that are highly suited to different applications:

TABLE 3

Effect of percentage of magnesium-iron silicates on different desired characteristics on the final cement structure

| Characteristic | Ideal % of Magnesium-Iron Silicate | |
|---|---|---|
| | Low | High |
| High Strength of Solid | 2 | 35 |
| Expansion to Compensate Shrinking | 10 | 98 |
| Sealing of Pores and Channels | 15 | 99 |
| Sealing of Pore Necks | 2 | 99 |

The table above is not a definitive statement of where the present invention has no effect. It is intended to give one skilled in the art an understanding of ranges to choose if one than one effect is important. For example, the range of 15% to 35% shows the best balance of characteristics for numerous applications. However, tests that have been performed of strength at 10% and 55% magnesium-iron silicate have demonstrated that the present invention is a significant improvement over Portland G.

In the current state of the cement industry, 10-55% is the easiest range for a company to add to their current production line. With a change in the process, however, the other ranges of use described in the table above, will be achieved. As shown above, the gas permeability characteristics of the present invention are very desirable over a large range of percentages.

The invention claimed is:

1. A cementitious mixture for reduced gas permeability that comprises:
   a) an alkaline cement;
   b) one or more divalent magnesium-iron silicates of the mineral group olivines that in neutral or basic aqueous solutions is a latent hydraulic binder comprising 2% to 99% of divalent magnesium-iron silicate by weight of total hydraulic solid materials.

2. The cementitious mixture of claim 1, wherein the magnesium-iron silicate is by weight of total hydraulic solid is between 10% and 98%.

3. The cementitious mixture of claim 1, wherein the magnesium-iron silicate by weight of total hydraulic solid is between 15% and 99%.

4. The cementitious mixture of claim 1, wherein the magnesium-iron silicate by weight of total hydraulic solid is between 10% and 55%.

5. The cementitious mixture of claim 1, wherein the magnesium-iron silicate by weight of total hydraulic solid is between 20% and 50%.

6. The cementitious mixture of claim 1, wherein the magnesium-iron silicate by weight of total hydraulic solid is between 20% and 80%.

7. The cementitious mixture of claim 1, wherein the magnesium-iron silicate by weight of total hydraulic solid is between 15% and 25%.

8. A cementitious slurry for reduced gas permeability that comprises:
   a) an alkaline cement;
   b) water; and
   c) one or more divalent magnesium-iron silicates of the mineral group olivines that in neutral or basic aqueous solutions is a latent hydraulic binder comprising 2% to 99% of divalent magnesium-iron silicate by weight of total hydraulic solid materials.

9. The cementitious slurry of claim 8, wherein the magnesium-iron silicate by weight of total hydraulic solid is between 15% and 25%.

10. The cementitious slurry of claim 8, wherein the magnesium-iron silicate by weight of total hydraulic solid is between 10% and 55%.

11. The cementitious slurry of claim 8, wherein the magnesium-iron silicate by weight of total hydraulic solid is between 20% and 80%.

12. The cementitious slurry according to claim 8, wherein the water has a chloride concentration of between 0.4% to 14 by weight.

* * * * *